(12) United States Patent
Sasaki et al.

(10) Patent No.: US 6,910,975 B2
(45) Date of Patent: *Jun. 28, 2005

(54) GOLF BALL

(75) Inventors: Takashi Sasaki, Kobe (JP); Takahiro Sajima, Kobe (JP)

(73) Assignee: Sumitomo Rubber Industries, Ltd., Kobe (JP)

(*) Notice: Subject to any disclaimer, the term of this patent is extended or adjusted under 35 U.S.C. 154(b) by 0 days.

This patent is subject to a terminal disclaimer.

(21) Appl. No.: 10/622,569

(22) Filed: Jul. 21, 2003

(65) Prior Publication Data

US 2004/0029649 A1 Feb. 12, 2004

(30) Foreign Application Priority Data

Aug. 12, 2002 (JP) .................................. 2002-234340

(51) Int. Cl.[7] .............................................. A63B 37/12
(52) U.S. Cl. ....................................................... 473/384
(58) Field of Search .................................. 473/378–385

(56) References Cited

U.S. PATENT DOCUMENTS

| | | | |
|---|---|---|---|
| 5,779,563 A | * | 7/1998 | Yamagishi et al. ......... 473/371 |
| 5,967,908 A | | 10/1999 | Yamagishi et al. |
| 6,210,292 B1 | | 4/2001 | Higuchi et al. |
| 6,336,873 B1 | | 1/2002 | Yamagishi et al. |
| 2003/0162609 A1 | * | 8/2003 | Sajima et al. ............... 473/378 |
| 2003/0186761 A1 | * | 10/2003 | Ohama et al. .............. 473/378 |

FOREIGN PATENT DOCUMENTS

| | | |
|---|---|---|
| EP | 0 897 732 A2 | 2/1999 |
| JP | 10-305114 A | 11/1998 |
| JP | 11-057067 A | 3/1999 |
| JP | 2000-225209 A | 8/2000 |
| JP | 2000-070414 A | 7/2003 |

* cited by examiner

*Primary Examiner*—Raeann Gorden
(74) *Attorney, Agent, or Firm*—Birch, Stewart, Kolasch & Birch, LLP

(57) ABSTRACT

A base polymer of a cover 3 of a golf ball 1 includes a thermoplastic polyurethane elastomer as a principal component. Dimples 6 are formed on the surface of the cover 3. A proportion R1 of number of dimples 6 having a ratio (B/T), which is a ratio of a height B of a bottom of the dimple 6 to a nominal thickness T of the cover 3, of equal to or less than 0.70 occupied in total number of the dimples is equal to or greater than 10%. A proportion R2 of number of dimples 6 having the ratio (B/T) of less than 0.30 occupied in total number of the dimples is equal to or less than 10%. A mean value of the ratio (B/T) for all the dimples 6 is equal to or less than 0.86. The golf ball 1 includes a mid layer 5 having Shore D hardness of equal to or greater than 55. Difference (Hm–Hc) between Shore D hardness Hm of the mid layer 5 and Shore D hardness Hc of the cover 3 is equal to or greater than 5.

7 Claims, 4 Drawing Sheets

GOLF BALL

BACKGROUND OF THE INVENTION

1. Field of the Invention

The present invention relates to golf balls. More particularly, the present invention relates to golf balls having a core and a cover, with dimples being formed on the cover.

2. Description of the Related Art

General golf balls other than those manufactured for use in practice ranges have a core and a cover. There exist cores composed of a single solid rubber layer, two or more solid rubber layers, a synthetic resin layer in addition to a solid rubber layer, and the like.

Although there are a variety of characteristics required for a golf ball to golfers, senior golfers tend to place great importance on spin performances in particular. High back spin speed results in small run (a distance from the position where the golf ball dropped to a position where it stopped, also referred to as "roll"). In other words, for golfers, golf balls which are liable to be spun backwards are apt to be rendered to stop at a targeted position. High side spin speed results in possibility of curving of the golf ball. In other words, for golfers, golf balls which are liable to be side spun are apt to be rendered to intentionally curve. Golf balls that are excellent in spin performances are excellent in control performances. Senior golfers particularly place great importance on control performances upon impact with a short iron.

In regard to a thickness of a cover, a variety of investigations have been conventionally conducted. Golf balls formed with a cover made of a soft material tend to have improved spin performance as the cover is thicker, and to the contrary, as the cover is thinner, they tend to have improved resilience performance. In other words, a golf ball having a soft and thick cover has a defect of inferior resilience performance, and a golf ball having a thin cover has a defect of inferior spin performance even though the cover is soft. The spin performance is thus a reciprocal performance to the resilience performance.

A golf ball has from about 200 to 550 dimples on its surface. A role of the dimples involves causing turbulent flow detachment through promoting turbulent flow transition of a boundary layer by disrupting the air flow around the golf ball during flight. By promoting the turbulent flow transition, detachment point of air from the golf ball shifts backwards leading to the reduction of a drag coefficient (Cd) so that flight distance of the golf ball is prolonged. In addition, difference of detachment points on the upper and lower sides of the golf ball resulting from back spin is increased by the promotion of turbulent flow transition, therefore, lift force that acts on the golf ball is elevated.

Specifications of the cover exert an influence upon behavior of a golf ball at impact of the golf ball and a golf club. To the contrary, specifications of the dimples exert an influence upon aerodynamic characteristics after the golf ball was left from the golf club. Specifications of the cover and specifications of the dimples are comprehended by the skilled person in this art as discrete factors in terms of performances of a golf ball.

In Japanese Patent Publication Reference JP-A-305114/1998, JP-A-57067/1999, JP-A-70414/2000 and JP-A-225209/2000, there are disclosed golf balls in which an optimized cover and optimized dimples are combined.

Even with the techniques disclosed in these publications, specifications of the dimples have been merely comprehended as a factor that exerts an influence upon aerodynamic characteristics. Specifications of the dimples have not been necessarily comprehended as a factor that exerts an influence upon behavior of a golf ball at impact. With respect to the behavior of a golf ball at impact, there remains room for the improvement. Golfers have desired golf balls that are excellent in both terms of a spin performance (i.e., a control performance), and a resilience performance.

SUMMARY OF THE INVENTION

A golf ball according to the present invention has a core, a cover and numerous dimples formed on the surface of this cover. Base polymer of the cover includes a thermoplastic polyurethane elastomer as a principal component. A proportion R1 of number of dimples having a ratio (B/T), which is a ratio of a height B of a bottom of the dimple to a nominal thickness T of the cover, of equal to or less than 0.70 occupied in total number of the dimples is equal to or greater than 10%.

In the cover of this golf ball, there coexist sites with the ratio (B/T) being equal to or less than 0.70 and sites with no dimples present. The sites of which ratio (B/T) being equal to or less than 0.70 are responsible for the resilience performance of the golf ball. The sites with no dimples present are responsible for the control performance of the golf ball on behalf of a synergistic effect with the thermoplastic polyurethane elastomer. This golf ball is excellent in both terms of a control performance and a resilience performance.

Preferably, a proportion R2 of number of dimples having a ratio (B/T) of less than 0.30 occupied in total number of the dimples is equal to or less than 10%. This golf ball is excellent also in durability.

Preferably, a mean value of the ratio (B/T) for all the dimples is equal to or less than 0.86. The resilience performance of this golf ball is significantly superior.

The present invention exerts a marked effect when the golf ball has a core composed of a center and a mid layer, and difference (Hm−Hc) between Shore D hardness Hm of the mid layer and Shore D hardness Hc of the cover is equal to or greater than 5. In particular, the present invention exerts a marked effect when the golf ball has a mid layer having Shore D hardness of equal to or greater than 55.

DESCRIPTION OF THE PREFERRED EMBODIMENTS

The present invention is hereinafter described in detail with appropriate references to the accompanying drawing according to the preferred embodiments of the present invention.

Figure 1:
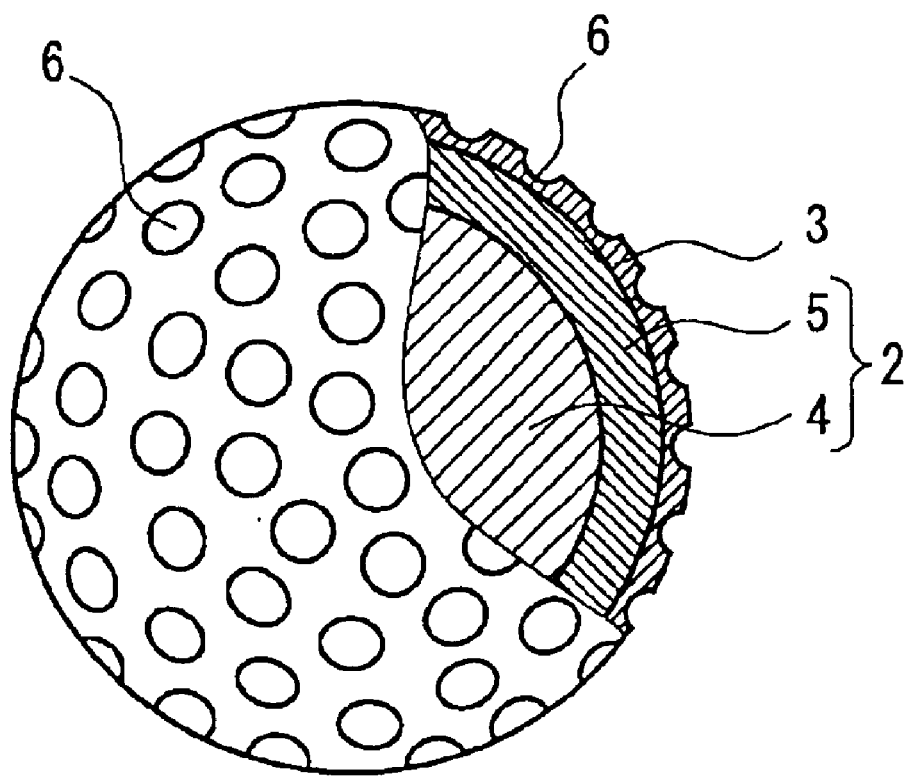
FIG. 1 is a schematic cross-sectional view illustrating a golf ball according to one embodiment of the present invention.

A golf ball 1 depicted in FIG. 1 has a spherical core 2 and a cover 3. The core 2 is composed of a center 4 and a mid layer 5. Numerous dimples 6 are formed on the surface of the cover 3. This golf ball 1 has a paint layer and a mark layer to the external side of the cover 3, although not shown in the Figure. This golf ball 1 has a diameter of from 40 mm to 45 mm in general, and in particular, of from 42 mm to 44 mm. In light of the reduction of an air resistance in the range to comply with a rule defined by United States Golf Association (USGA), the diameter is preferably 42.67 mm or greater and 42.80 mm or less. Weight of this golf ball 1 is generally 40 g or greater and 50 g or less and particularly 44 g or greater and 47 g or less. In light of the elevation of inertia in the range to comply with a rule defined by USGA, the weight is particularly preferably 45.00 g or greater and 45.93 g or less.

The cover 3 herein means an outermost layer except for the paint layer and the mark layer. There exist golf balls referred to as having a two-layered cover, and in this instance, the outer layer corresponds to the cover 3 herein.

Base polymer of the cover 3 is a thermoplastic polyurethane elastomer. General thermoplastic polyurethane elastomers include a polyurethane component as a hard segment, and a polyester component or a polyether component as a soft segment. The thermoplastic polyurethane elastomer is responsible for the control performance of the golf ball 1. Further, the thermoplastic polyurethane elastomer is also responsible for a scuff resistance of the cover 3.

Illustrative examples of the curing agent for the polyurethane component include alicyclic diisocyanates, aromatic diisocyanates and aliphatic diisocyanates. Particularly, alicyclic diisocyanates are preferred. Because an alicyclic diisocyanate has no double bond in its main chain, yellowing of the cover 3 may be suppressed. In addition, because an alicyclic diisocyanate is excellent in strength, scratches of the cover 3 may be suppressed. Two or more kinds of diisocyanates may be used in combination.

Illustrative examples of the alicyclic diisocyanate include 4,4'-dicyclohexylmethane diisocyanate ($H_{12}MDI$) which is a hydrogenated product of 4,4'-diphenylmethane diisocyanate, 1,3-bis(isocyanatomethyl)cyclohexane ($H_6XDI$) which is a hydrogenated product of xylylene diisocyanate, isophorone diisocyanate (IPDI) and trans-1,4-cyclohexane diisocyanate (CHDI). In light of general-purpose properties and processing characteristics, $H_{12}MDI$ is preferred. Specific examples of the thermoplastic polyurethane elastomer including $H_{12}MDI$ as a constituent component include trade name "Elastolan XNY90A", trade name "Elastolan XNY97A" and trade name "Elastolan XNY585" of BASF Polyurethane Elastomers Ltd.

As a base polymer of the cover 3, other synthetic resin may be used together with the thermoplastic polyurethane elastomer. When other synthetic resin is used with the thermoplastic polyurethane elastomer in combination, thermoplastic polyurethane elastomer is included as a principal component, in light of the control performance. Proportion of the thermoplastic polyurethane elastomer occupied in total base polymer is preferably equal to or greater than 50% by weight, more preferably equal to or greater than 60% by weight, and particularly preferably equal to or greater than 70% by weight.

Illustrative examples of the synthetic resin which may be used include thermoplastic polyamide elastomers, thermoplastic polyester elastomers, thermoplastic polyolefin elastomers and ionomer resins. A synthetic resin having a polar group such as a carboxyl group, a glycidyl group, a sulfone group, an epoxy group or the like may also be used. In particular, thermoplastic polyamide elastomers are preferred. A thermoplastic polyamide elastomer is excellent in compatibility with a thermoplastic polyurethane elastomer. The thermoplastic polyamido elastomer is also responsible for the resilience performance of the golf ball 1. When a thermoplastic polyurethane elastomer and a thermoplastic polyamide elastomer are used in combination, weight ratio of both components is preferably 70/30 or greater and 95/5 or less.

General thermoplastic polyamide elastomers include a polyamide component as a hard segment, and a polyester component or a polyether component as a soft segment. Suitable soft segment is a polyether component. Specific examples of suitable thermoplastic polyamide elastomer include trade name "Pevax 5533" of ATOFINA Japan Co., Ltd.

To the cover 3 may be blended a coloring agent such as titanium dioxide, a filler such as barium sulfate, a dispersant, an antioxidant, an ultraviolet absorbent, a light stabilizer, a fluorescent agent, a fluorescent brightening agent and the like in an appropriate amount as needed. The cover 3 may be blended with powder of highly dense metal such as tungsten, molybdenum and the like for the purpose of adjusting specific gravity.

Shore D hardness Hc of the cover 3 is preferably equal to or less than 55. In other words, it is preferred that the cover 3 has relatively low hardness. By employing a cover 3 having low hardness, a contact time period and a contact area of the golf ball 1 with a club face upon impact with the golf club are increased. A spin performance of the golf ball 1 is thereby improved, leading to the improvement of a control performance. In this respect, hardness Hc of the cover 3 is more preferably equal to or less than 50. When hardness Hc of the cover 3 is too low, the resilience performance of the golf ball 1 becomes insufficient. Therefore, hardness Hc is preferably equal to or greater than 30, more preferably equal to or greater than 35, and particularly preferably equal to or greater than 40.

Figure 2:
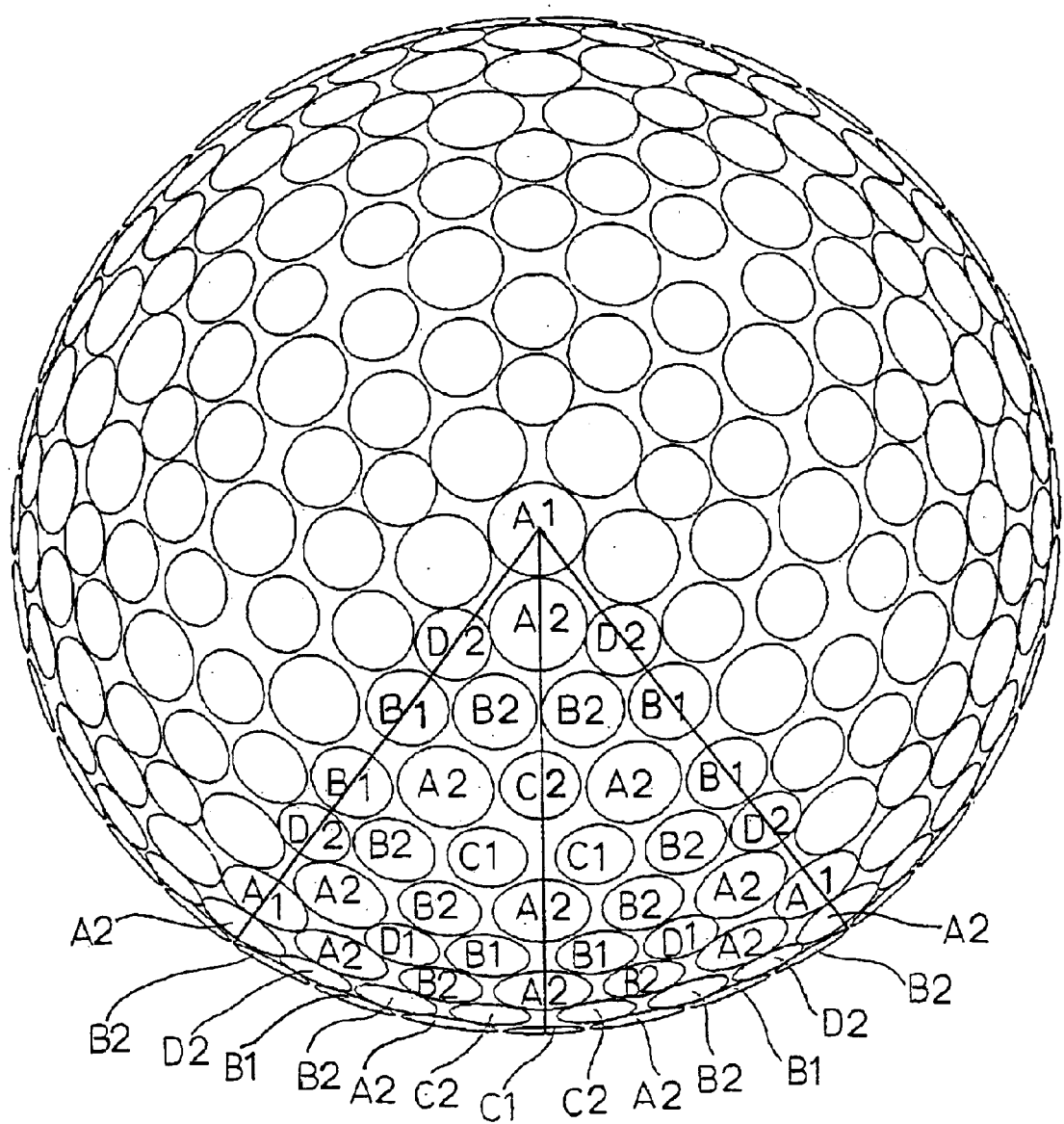
FIG. 2 is an enlarged plan view illustrating the golf ball shown in FIG. 1.
Figure 3:
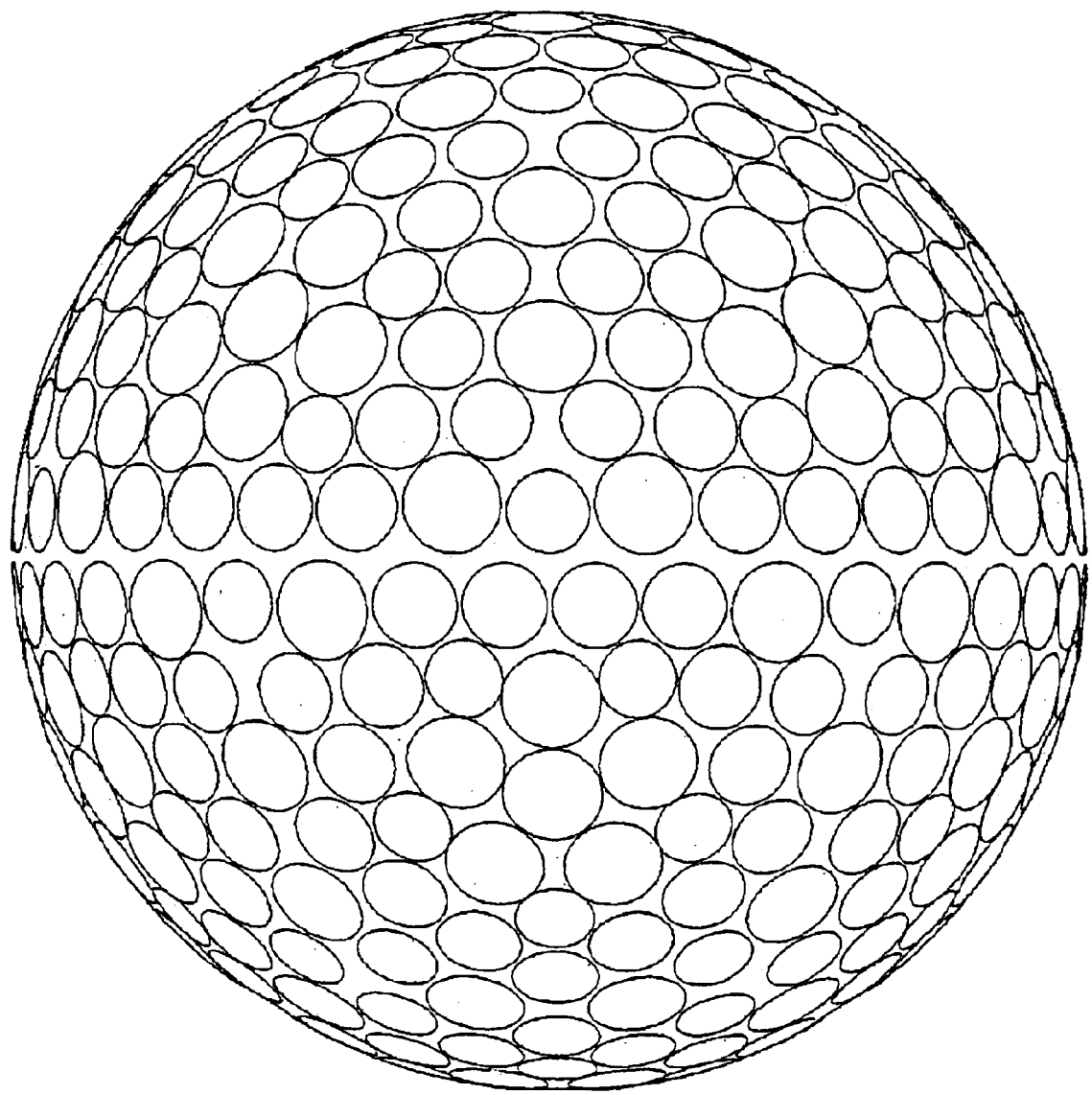
FIG. 3 is an enlarged front view illustrating the golf ball shown in FIG. 1.

FIG. 2 is an enlarged plan view illustrating the golf ball 1 shown in FIG. 1, and FIG. 3 is a front view of the same. FIG. 2 illustrates kinds of the dimples 6 for one unit which is provided by dividing the surface of the golf ball 1 into 10 equivalent units. Plane shape of all the dimples 6 is circular. This golf ball 1 includes A1 dimples having a diameter of 4.05 mm and a depth of 0.1763 mm, A2 dimples having a diameter of 4.05 mm and a depth of 0.1763 mm, B1 dimples having a diameter of 3.50 mm and a depth of 0.1518 mm, B2 dimples having a diameter of 3.50 mm and a depth of 0.1518 mm, C1 dimples having a diameter of 3.35 mm and a depth of 0.1458 mm, C2 dimples having a diameter of 3.35 mm and a depth of 0.5658 mm, D1 dimples having a diameter of 3.20 mm and a depth of 0.5600 mm, and D2 dimples having a diameter of 3.20 mm and a depth of 0.5600 mm. Number of the A1 dimple is 12; number of the A2 dimple is 120; number of the B1 dimple is 60; number of the B2 dimple is 120; number of the C1 dimple is 30; number of the C2 dimple is 30; number of the D1 dimple is 20; and number of the D2 dimple is 40. Total number of dimples 6 of this golf ball 1 is 432.

Figure 4:
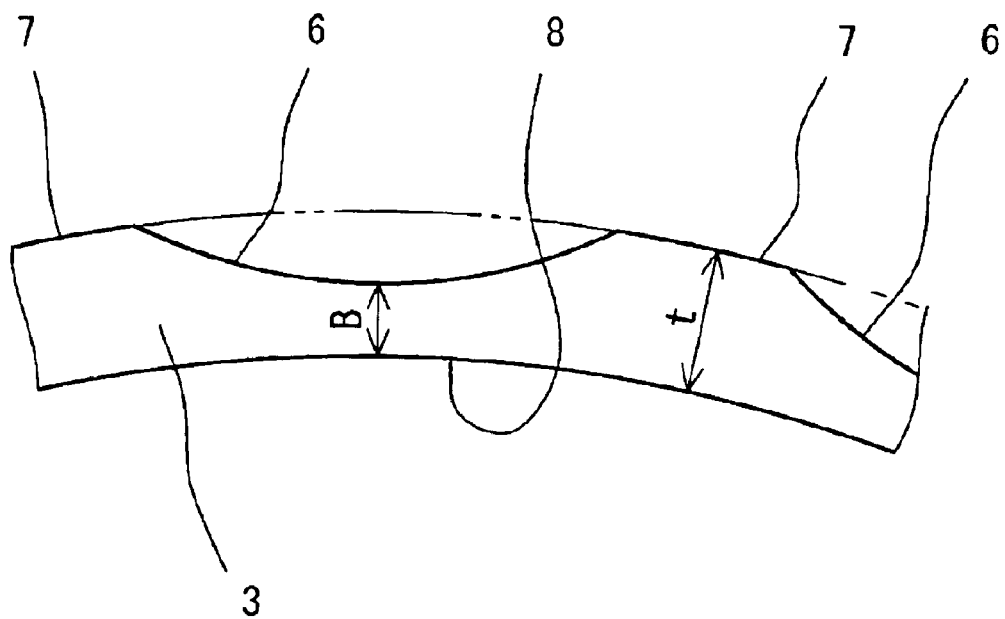
FIG. 4 is an enlarged cross-sectional view illustrating a part of the golf ball shown in FIG. 1.

FIG. 4 is an enlarged cross-sectional view illustrating a part of the golf ball 1 shown in FIG. 1. In this Figure, the cover 3 and the dimples 6 are depicted. A phantom spherical surface (A surface of the golf ball 1 when it was postulated that there is no dimple 6 existed) is depicted by a chain double-dashed line. The surface of the cover 3 is composed of the dimples 6 and a land part 7. The cover 3 is the thickest immediately below the land part 7, and the thinnest immediately below the bottom of the dimple 6.

In FIG. 4, a thickness of the cover 3 immediately below the land part 7 is depicted by a both-sided arrowhead t. Nominal thickness T of this golf ball 1 is calculated by: envisioning a regular octahedron inscribing the phantom spherical surface; determining land parts 7 that are closest to each of the six apexes of this regular octahedron; and averaging the thicknesses t measured at these six land parts 7.

In FIG. 4, a height of a bottom of the dimple 6 is depicted by a both-sided arrowhead B. This height B is a distance between an underside surface 8 of the cover 3 (a surface that contacts with the core 2) and the deepest portion of the dimple 6. In other words, the height B is the shortest distance between the core 2 (see FIG. 1) and the dimple 6.

A ratio (B/T), which is a ratio of the height B of a bottom of a dimple 6 to the nominal thickness T of the cover 3 is an indication representing the thickness of the cover 3 immediately below the dimple 6. In the golf ball 1 shown in FIGS. 1–4, the ratio (B/T) of the A1 dimple of is 0.864; the ratio (B/T) of the A2 dimple is 0.864; the ratio (B/T) of the B1 dimple is 0.883; the ratio (B/T) of the B2 dimple is 0.883; the ratio (B/T) of the C1 dimple is 0.888; the ratio (B/T) of the C2 dimple is 0.565; the ratio (B/T) of the D1 dimple is 0.569; and the ratio (B/T) of the D2 dimple is 0.569. In this golf ball 1, the number of dimples having the ratio (B/T) of equal to or less than 0.70 is 90. The proportion R1 of number of dimples 6 having the ratio (B/T) of equal to or less than 0.70 (90 dimples) occupied in total number of the dimples (432 dimples) is 20.8%.

The proportion R1 of this golf ball 1 is greater in comparison with the proportions R1 of conventional golf balls. To this golf ball 1, there exist numerous sites where the thickness of the cover 3 is relatively small (hereinafter referred to as "thin-walled site"). This golf ball 1 is excellent in a resilience performance. Although grounds for such an excellent resilience performance of this golf ball 1 are not certain in detail, it is speculated that existing numerous thin-walled sites may exert some influences on the behavior of the golf ball 1 at impact to reduce energy loss. Dimples 6 have been originally provided for the purpose of improving the aerodynamic characteristics of the golf ball 1, and play a role in improving a flight performance by optimizing a trajectory following the impact. According to the present invention, dimples 6 play a role in improving a resilience performance, in addition to the original role of improving the aerodynamic characteristics, by setting the proportion R1 to be in a predetermined range.

According to the findings attained by the present inventor, high resilience performance can be achieved by setting the proportion R1 to be equal to or greater than 10%, even in the instances where a cover 3 having low hardness is employed. By means of high proportion R1 as well as a cover 3 having low hardness, a feel at impact and a resilience performance of the golf ball 1 are both accomplished concurrently.

In light of the resilience performance, the proportion R1 is preferably equal to or greater than 15%, and more preferably equal to or greater than 20%. When the proportion R1 is too large, the control performance and durability of the golf ball 1 become insufficient. Therefore, the proportion R1 is preferably equal to or less than 90%, more preferably equal to or less than 70%, and particularly preferably equal to or less than 60%.

A site with the cover 3 having a thickness being extremely small is in danger of becoming an origin of a crack. In light of durability of the golf ball 1, it is preferred that sites with the cover 3 having a thickness being extremely small are as few as possible. In particular, a proportion R2 of number of dimples 6 having a ratio (B/T) of less than 0.30 occupied in total number of the dimples is preferably equal to or less than 10%, more preferably equal to or less than 5%, and is ideally 0%. In the golf ball 1 shown in FIGS. 1–4, the proportion R2 is 0%.

Mean value of the ratio (B/T) is preferably equal to or less than 0.86. When the mean value is beyond this range, the resilience performance of the golf ball 1 may become deteriorated. In this respect, the mean value is more preferably equal to or less than 0.85, and particularly preferably equal to or less than 0.83. When the mean value is too small, the control performance and durability of the golf ball 1 may become insufficient. In this respect, the mean value is preferably equal to or greater than 0.50, more preferably equal to or greater than 0.60, and particularly preferably equal to or greater than 0.70. The mean value is calculated by summing values of the ratio (B/T) for all the dimples 6, and dividing this summed value by total number of the dimples. In the golf ball 1 shown in FIGS. 1–4, a mean value of the ratio (B/T) is 0.812.

As described above, the thickness of the cover 3 is the largest immediately below the land part 7. This site is hereinafter referred to as "thick-walled site". The thick-walled site greatly deforms upon impact. Great deformation results in suppression of slipping of the golf ball 1 with the club face upon impact, thereby imparting spin with high speed to the golf ball 1. In other words, the thick-walled site is responsible for the control performance of the golf ball 1. The thermoplastic polyurethane elastomer which is a principal component of the cover 3 is excellent in deformability. According to this golf ball 1, extremely excellent control performance is exerted by a synergistic effect of the thick-walled site and the thermoplastic polyurethane elastomer.

Surface area occupation percentage Y of the dimples 6 is preferably 70% or greater and 90% or less. When the surface area occupation percentage Y is less than the above range, lift force of the golf ball 1 during the flight may be deficient. In this respect, the surface area occupation percentage Y is more preferably equal to or greater than 72%, and particularly preferably equal to or greater than 74%. When the surface area occupation percentage Y is beyond the above range, a trajectory of the golf ball 1 may become too high. In this respect, the surface area occupation percentage Y is more preferably equal to or less than 88%, and particularly preferably equal to or less than 86%. The surface area occupation percentage Y of the golf ball 1 shown in FIGS. 1–4 is 77.6%.

The term "surface area occupation percentage Y" herein means a value obtained by dividing a summation of the area of all the dimples 6 with the surface are of the phantom sphere. The "area of dimple 6" herein means the area of a plan shape of the dimple 6 (a shape of a contour of the dimple 6 when it is observed by viewing the center of the golf ball 1 at infinity). In the instance of a circular dimple 6 having a diameter of d, the area s is calculated by the following formula.

$$s=(d/2)^2 \times \pi$$

Total volume V of the dimples 6 is preferably 400 $mm^3$ or greater and 700 $mm^3$ or less. When the total volume V is less than the above range, hopping trajectory may be provided. In this respect, the total volume V is more preferably equal to or greater than 420 $mm^3$, and particularly preferably equal to or greater than 440 $mm^3$. When the total volume V is beyond the above range, dropping trajectory may be provided. In this respect, the total volume V is more preferably equal to or less than 650 mm³, and particularly preferably equal to or less than 600 mm³. Total volume V of the golf ball 1 shown in FIGS. 1–4 is 517 mm³.

"Total volume V" herein means a summation of the volume v of all the dimples 6. The "volume v of the dimple 6" herein means volume of a space surrounded by a phantom spherical surface and the surface of a dimple 6.

The diameter of the dimple 6 is preferably 2.0 mm or greater and 6.0 mm or less. When the diameter is less than the above range, a travel distance of the golf ball 1 may become insufficient. In this respect, the diameter is more preferably equal to or greater than 2.3 mm, and particularly preferably equal to or greater than 2.6 mm. When the diameter is beyond the above range, the aerodynamically symmetric property of the golf ball 1 may become insufficient. In this respect, the diameter is more preferably equal to or less than 5.5 mm, and particularly preferably equal to or less than 5.0 mm. In light of the flight performance, it is preferred that multiple kinds of dimples 6 are provided having a different diameter with each other. In this instance, it is preferred that the diameters are set to be in the range described above for all of the kinds.

Depth of the dimple 6 (a distance between the phantom spherical face and the deepest portion of the dimple 6) is determined ad libitum so that the ratio (B/T) falls within the range as described above. In general, the depth is set to be 0.05 mm or greater and 1.00 mm or less, and particularly, be 0.10 mm or greater and 0.80 mm or less. In light of the flight performance, it is preferred that multiple kinds of dimples 6 are provided having a different depth with each other. In this instance, it is preferred that the depths are set to be in the range described above for all of the kinds. Preferably, three or more kinds of dimples 6 are provided having a different diameter or depth.

In stead of the circular dimples 6, or together with the circular dimples 6, non-circular dimples may be formed. Specific examples of the non-circular dimple include polygonal dimples, elliptical dimples, tear drops-like shaped dimples and the like. The area of the non-circular dimple is preferably 3 mm³ or greater and 29 mm³ or less.

Total number of the dimples 6 is preferably 250 or greater and 500 or less. When the total number is less than the above range, there is a possibility that the fundamental feature of the golf ball 1 which is a substantially spherical body may not be sustained. In this respect, total number is more preferably equal to or more than 260, and particularly preferably equal to or more than 280. When the total number is beyond the above range, a drag coefficient (Cd) may become so large that the travel distance may become insufficient. In this respect, total number is more preferably equal to or less than 480, and particularly preferably equal to or less than 450.

Size of the dimple 6 can be determined by actual measurement of the golf ball 1. The golf ball 1 generally has a paint layer on its surface, and thus accurate measurement of the size may involve difficulties owing to the influences of this paint layer. According to the present invention, as a matter of convenience, the size of the golf ball 1 after removing the paint layer is actually measured. Alternatively, the golf ball 1 prior to the painting may be actually measured.

Nominal thickness T of the cover 3 is preferably 0.2 mm or greater and 2.0 mm or less. When the nominal thickness T is less than the above range, the control performance and durability of the golf ball 1 may become insufficient. In this respect, the nominal thickness T is more preferably equal to or greater than 0.3 mm, and particularly preferably equal to or greater than 0.5 mm. When the nominal thickness T is beyond the range described above, the resilience performance may become insufficient. In this respect, the nominal thickness T is more preferably equal to or less than 1.8 mm, and particularly preferably equal to or less than 1.5 mm.

In general, the center 4 is obtained through crosslinking of a rubber composition. Examples of suitable base rubber for use in the rubber composition include polybutadienes, polyisoprenes, styrene-butadiene copolymers, ethylene-propylene-diene copolymers, natural rubbers and the like. Two or more kinds of these rubbers may be used in combination. In view of the resilience performance, polybutadienes are preferred. In the case where another rubber is used in combination with a polybutadiene, to employ a polybutadiene as a predominant component is preferred. More specifically, it is preferred that a proportion of polybutadiene occupied in total base rubber be equal to or greater than 50% by weight, and particularly equal to or greater than 80% by weight. Among polybutadienes, high cis-polybutadienes are preferred, which have a percentage of cis-1,4 bond of equal to or greater than 40%, and particularly equal to or greater than 80%.

For crosslinking of the center 4, a co-crosslinking agent is usually used. Preferable co-crosslinking agent in view of the resilience performance is a monovalent or bivalent metal salt of α,β-carboxylic acid having 2 to 8 carbon atoms. Specific examples of the preferable co-crosslinking agent include zinc acrylate, magnesium acrylate, zinc methacrylate and magnesium methacrylate. Zinc acrylate is particularly preferred on the grounds that a high resilience performance can be achieved.

As a co-crosslinking agent, an α,β-unsaturated carboxylic acid having 2 to 8 carbon atoms, and a metal oxide may be blended. Both components react in the rubber composition to give a salt. This salt serves as a co-crosslinking agent. Preferable α,β-unsaturated carboxylic acids include acrylic acid and methacrylic acid, and in particular, acrylic acid is preferred. Preferable metal oxides include zinc oxide and magnesium oxide, and in particular, zinc oxide is preferred.

The amount of the co-crosslinking agent to be blended is preferably 10 parts by weight or greater and 50 parts by weight or less per 100 parts by weight of the base rubber. When the amount to be blended is less than the above range, the resilience performance of the golf ball 1 may become insufficient. In this respect, the amount to be blended is more preferably equal to or greater than 12 parts by weight, and particularly preferably equal to or greater than 15 parts by weight. When the amount to be blended is beyond the above range, the feel at impact of the golf ball 1 may become hard. In this respect, the amount to be blended is particularly preferably equal to or less than 45 parts by weight.

In the rubber composition for use in the center 4, an organic peroxide may be preferably blended together with the co-crosslinking agent. The organic peroxide is responsible for a crosslinking reaction. By blending the organic peroxide, the resilience performance of the golf ball 1 may be improved. Examples of suitable organic peroxide include dicumyl peroxide, 1,1-bis(t-butylperoxy)-3,3,5-trimethylcyclohexane, 2,5-dimethyl-2,5-di(t-butylperoxy) hexane and di-t-butyl peroxide. Particularly versatile organic peroxide is dicumyl peroxide.

The amount of the organic peroxide to be blended is preferably 0.1 part by weight or greater and 3.0 parts by weight or less per 100 parts by weight of the base rubber. When the amount to be blended is less than the above range, the resilience performance of the golf ball 1 may become insufficient. In this respect, the amount to be blended is more preferably equal to or greater than 0.3 part by weight, and particularly preferably equal to or greater than 0.5 part by weight. When the amount to be blended is beyond the above range, the feel at impact of the golf ball 1 may become hard. In this respect, the amount to be blended is particularly preferably equal to or less than 2.5 parts by weight.

The center 4 may be blended with a filler for the purpose of adjusting specific gravity and the like. Examples of suitable filler include zinc oxide, barium sulfate, calcium carbonate and magnesium carbonate. Powder of highly dense metal may be blended as a filler. Specific examples of the highly dense metal include tungsten and molybdenum. The amount of the filler to be blended is determined ad libitum so that the intended specific gravity of the center 4 can be accomplished. Particularly preferable filler is zinc oxide. Zinc oxide it serves not only as a mere agent for adjusting specific gravity but also as a crosslinking activator. Various kinds of additives such as sulfur, an anti-aging agent, a coloring agent, a plasticizer, a dispersant and the like may be blended at an appropriate amount to the center 4 as needed. The center 4 may be further blended with crosslinked rubber powder or synthetic resin powder.

The diameter of a general center 4 is set to be 25 mm or greater and 41 mm or less, and particularly 27 mm or greater and 40 mm or less. Crosslinking temperature of the center 4 is in general, from 140° C. or greater and 180° C. or less. The crosslinking time period of the center 4 is in general, 10 minutes or longer and 60 minutes or less.

The mid layer 5 may be composed of a crosslinked rubber, or may be composed of a resin composition. When it is composed of a crosslinked rubber, the base rubber thereof may be similar to the base rubber for the center 4 as described above. Furthermore, a similar co-crosslinking agent and organic peroxide to those which may be blended in the center 4 as described above can be blended. The amount of the co-crosslinking agent to be blended is preferably 15 parts by weight or greater and 50 parts by weight or less per 100 parts by weight of the base rubber. When the amount to be blended is less than the above range, the resilience performance of the golf ball 1 may become insufficient. In this respect, the amount to be blended is more preferably equal to or greater than 20 parts by weight. When the amount to be blended is beyond the above range, the feel at impact of the golf ball 1 may become deteriorated. In this respect, the amount to be blended is more preferably equal to or less than 45 parts by weight, and particularly preferably equal to or less than 40 parts by weight.

The amount of the organic peroxide to be blended in the mid layer 5 is preferably 0.1 part by weight or greater and 6.0 parts by weight or less per 100 parts by weight of the base rubber. When the amount to be blended is less than the above range, the resilience performance of the golf ball 1 may become insufficient. In this respect, the amount to be blended is more preferably equal to or greater than 0.3 part by weight, and particularly preferably equal to or greater than 0.5 part by weight. When the amount to be blended is beyond the above range, the feel at impact of the golf ball 1 may become hard. In this respect, the amount to be blended is more preferably equal to or less than 5.0 parts by weight, and particularly preferably equal to or less than 4.0 parts by weight. Also in the mid layer 5, may be blended with a similar filler and various kinds of additives to those which may be blended in the center 4 as described above.

When the mid layer 5 is composed of a resin composition, examples of suitable base polymer include ionomer resins, thermoplastic polyester elastomers, thermoplastic polyamide elastomers, thermoplastic polyurethane elastomers, thermoplastic polyolefin elastomers and thermoplastic polystyrene elastomers. Two or more kinds of synthetic resins may be used in combination.

Of the ionomer resins, copolymers of α-olefin and an α,β-unsaturated carboxylic acid having 3 to 8 carbon atoms in which part of the carboxylic acid is neutralized with a metal ion are suitable. Preferable α-olefin is ethylene and propylene. Preferable α,β-unsaturated carboxylic acid is acrylic acid and methacrylic acid. Illustrative examples of the metal ion for use in the neutralization include sodium ion, potassium ion, lithium ion, zinc ion, calcium ion, magnesium ion, aluminum ion and neodymium ion. The neutralization may also be carried out with two or more kinds of the metal ions. In light of the resilience performance and durability of the golf ball 1, particularly suitable metal ions are sodium ion, zinc ion, lithium ion and magnesium ion.

Thickness of the mid layer 5 is preferably 0.5 mm or greater and 4.0 mm or less. When the thickness is less than the above range, the resilience performance of the golf ball 1 may become insufficient. In this respect, the thickness is more preferably equal to or greater than 0.7 mm. When the thickness is beyond the above range, the feel at impact of the golf ball 1 may become insufficient. In this respect, the thickness is more preferably equal to or less than 3.0 mm, and particularly preferably equal to or less than 2.0 mm.

Shore D hardness Hm of the mid layer 5 is preferably equal to or greater than 55. The resilience performance of the golf ball 1 is thereby improved. In this respect, hardness Hm is more preferably equal to or greater than 58, and particularly preferably equal to or greater than 60. When hardness Hm is extremely high, the feel at impact of the golf ball 1 becomes insufficient. In this respect, hardness Hm is preferably equal to or less than 70, and more preferably equal to or less than 65.

Difference (Hm−Hc) between Shore D hardness Hm of the mid layer 5 and Shore D hardness Hc of the cover 3 is preferably equal to or greater than 5. The resilience performance of the golf ball 1 is thereby improved. In this respect, the difference of hardness (Hm−Hc) is more preferably equal to or greater than 8, and particularly preferably equal to or greater than 10. When the difference of hardness (Hm−Hc) is extremely large, the feel at impact of the golf ball 1 becomes insufficient. In this respect, difference of hardness (Hm−Hc) is preferably equal to or less than 40, more preferably equal to or less than 35, and particularly preferably equal to or less than 30. Shore D hardness of the cover 3 and the mid layer 5 is measured in accordance with a standard of "ASTM-D 2240-68", with a Shore D type spring hardness scale. When the subject to be measured (cover 3 or mid layer 5) consists of a resin composition, hardness is measured with a slab formed from this resin composition. When the subject to be measured consists of a crosslinked rubber composition, hardness is measured with a slab prepared by crosslinking of this rubber composition under an identical condition to the crosslinking condition of the subject to be measured.

The center 4 of the golf ball 1 depicted in FIG. 1 is composed of a single layer, however, a center composed of two or more layers may be employed. Another mid layer may be provided between the center 4 and the mid layer 5, or another mid layer may be provided between the mid layer 5 and the cover 3. A core 2 composed of a single layer without including a mid layer 5 may be also employed. In a golf ball 1 having two or more mid layers, it is preferred that in at least one mid layer, Shore D hardness Hm thereof is set to be greater than Shore D hardness Hc of the cover 3 by 5 or more; and Shore D hardness of that mid layer 5 is preferably equal to or greater than 55.

EXAMPLES

Specifications of a core, a cover and dimples were defined as presented in Table 1 below, and golf balls of Examples 1 to 5 and Comparative Examples 1 to 4 were obtained. The diameter of these golf balls is 42.7 mm. Details of specifications of the center and the mid layer are presented in Table 2; details of specifications of the cover are presented in Table 3; and details of specifications of the dimples are presented in Table 4.

TABLE 1

Specification of golf ball

|  |  |  | Example 1 | Example 2 | Example 3 | Example 4 | Example 5 | Comparative Example 1 | Comparative Example 2 | Comparative Example 3 | Comparative Example 4 |
|---|---|---|---|---|---|---|---|---|---|---|---|
| Core | Center | Blend type | a | a | a | a | b | a | a | a | a |
|  |  | Diameter (mm) | 36.1 | 36.1 | 36.1 | 37.5 | 36.1 | 36.1 | 36.1 | 36.1 | 36.1 |
|  | Mid | Blend type | c | c | c | d | c | c | c | c | c |
|  | layer | Diameter (mm) | 2.0 | 2.0 | 2.0 | 1.3 | 2.0 | 2.0 | 2.0 | 2.0 | 2.0 |
| Cover |  | Blend type | W | W | X | W | W | W | W | Y | Z |
|  |  | Nominal thickness (mm) | 1.3 | 1.3 | 1.3 | 1.3 | 1.3 | 1.3 | 1.3 | 1.3 | 1.3 |
| Dimple type |  |  | A | B | A | A | A | C | D | A | A |

TABLE 2

Specification of center and mid layer

| Blend type |  | a | b | c | d |
|---|---|---|---|---|---|
| Polybutadiene | *1 | 100 | 100 | 100 | — |
| Zinc acrylate |  | 27 | 30 | 36 | — |
| Zinc oxide |  | 5 | 5 | 5 | — |
| Barium sulfate | *2 | appropriate amount | appropriate amount | appropriate amount | — |
| Dicumyl peroxide |  | 0.8 | 0.8 | 0.8 | — |
| Ionomer resin | *3 | — | — | — | 50 |
| Ionomer resin | *4 | — | — | — | 50 |
| Crosslinking condition | Temperature(° C.) | 160 | 160 | 170 | — |
|  | Time(min) | 25 | 25 | 15 | — |

*1: JSR Corporation, trade name "BR11"
*2: Altered to give the golf ball weight of 45.4 g
*3: Dupont-Mitsui Polychemicals Co., Ltd., trade name "Himilan 1605"
*4: Dupont-Mitsui Polychemicals Co., Ltd., trade name "Himilan 1706"

TABLE 3

Specification of cover

| Blend type |  | W | X | Y | Z |
|---|---|---|---|---|---|
| Thermoplastic polyurethane elastomer | *5 | 80 | — | — | — |
| Thermoplastic polyurethane elastomer | *6 | — | 80 | — | — |
| Thermoplastic polyamide elastomer | *7 | 20 | 20 | — | — |
| Ionomer resin | *8 | — | — | 50 | — |
| Ionomer resin | *3 | — | — | 50 | 50 |
| Ionomer resin | *9 | — | — | — | 50 |
| Titanium dioxide |  | 4 | 4 | 4 | 4 |

*3: Dupont-Mitsui Polychemicals Co., Ltd., trade name "Himilan 1605"
*5: BASF Polyurethane Elastomers Ltd., trade name "Elastolan XNY90A"
*6: BASF Polyurethane Elastomers Ltd., trade name "Elastolan XNY97A"
*7: ATOFINA Japan Co., Ltd., trade name "Pebax 5533"
*8: Dupont-Mitsui Polychemicals Co., Ltd., trade name "Himilan 1557"
*9: Dupont-Mitsui Polychemicals Co., Ltd., trade name "Himilan AM7316"

TABLE 4

Specification of dimple

| Type | Kind | Number | Diameter (mm) | Depth (mm) | Volume (mm³) | (B/T) | Total volume (mm³) | Proportion R1 (%) | (B/T) average |
|---|---|---|---|---|---|---|---|---|---|
| A | A1 | 12 | 4.05 | 0.1763 | 1.136 | 0.864 | 517 | 20.8 | 0.812 |
|  | A2 | 120 | 4.05 | 0.1763 | 1.136 | 0.864 |  |  |  |
|  | B1 | 60 | 3.50 | 0.1518 | 0.731 | 0.883 |  |  |  |
|  | B2 | 120 | 3.50 | 0.1518 | 0.731 | 0.883 |  |  |  |
|  | C1 | 30 | 3.35 | 0.1458 | 0.643 | 0.888 |  |  |  |
|  | C2 | 30 | 3.35 | 0.5658 | 2.559 | 0.565 |  |  |  |
|  | D1 | 20 | 3.20 | 0.5600 | 2.318 | 0.569 |  |  |  |
|  | D2 | 40 | 3.20 | 0.5600 | 2.318 | 0.569 |  |  |  |
| B | A1 | 12 | 4.05 | 0.6463 | 4.250 | 0.503 | 515 | 16.7 | 0.826 |
|  | A2 | 120 | 4.05 | 0.1813 | 1.168 | 0.861 |  |  |  |
|  | B1 | 60 | 3.50 | 0.5718 | 2.817 | 0.560 |  |  |  |
|  | B2 | 120 | 3.50 | 0.1518 | 0.731 | 0.883 |  |  |  |
|  | C1 | 30 | 3.35 | 0.1458 | 0.643 | 0.888 |  |  |  |
|  | C2 | 30 | 3.35 | 0.1458 | 0.643 | 0.888 |  |  |  |
|  | D1 | 20 | 3.20 | 0.1200 | 0.483 | 0.908 |  |  |  |
|  | D2 | 40 | 3.20 | 0.1200 | 0.483 | 0.908 |  |  |  |
| C | A1 | 12 | 4.05 | 0.2263 | 1.459 | 0.826 | 516 | 6.9 | 0.821 |
|  | A2 | 120 | 4.05 | 0.2263 | 1.459 | 0.826 |  |  |  |

TABLE 4-continued

| Type | Kind | Number | Diameter (mm) | Depth (mm) | Volume (mm³) | (B/T) | Total volume (mm³) | Proportion R1 (%) | (B/T) average |
|---|---|---|---|---|---|---|---|---|---|
| | B1 | 60 | 3.50 | 0.2018 | 0.972 | 0.845 | | | |
| | B2 | 120 | 3.50 | 0.2018 | 0.972 | 0.845 | | | |
| | C1 | 30 | 3.35 | 0.1958 | 0.864 | 0.849 | | | |
| | C2 | 30 | 3.35 | 0.5658 | 2.559 | 0.565 | | | |
| | D1 | 20 | 3.20 | 0.1900 | 0.765 | 0.854 | | | |
| | D2 | 40 | 3.20 | 0.1900 | 0.765 | 0.854 | | | |
| D | A | 264 | 3.80 | 0.2597 | 1.513 | 0.865 | 515 | 0 | 0.875 |
| | B | 120 | 3.20 | 0.2100 | 0.833 | 0.885 | | | |
| | C | 48 | 2.35 | 0.1574 | 0.330 | 0.904 | | | |

Dimple patterns of type A, type B and type C shown in Table 4 are illustrated in FIG. 2 and FIG. 3.

[Measurement of Amount of Compressive Deformation]

The golf ball was first placed on a hard plate made of metal. Next, a cylinder made of metal was rendered to descend gradually toward the golf ball, and thus the golf ball, which was intervened between the bottom face of this cylinder and the hard plate, was deformed. Then, a migration distance of the cylinder was measured, starting from the state in which an initial load of 98 N was applied to the golf ball up to the state in which a final load of 1274 N was applied thereto. The results thus obtained are shown in Table 5 below.

[Measurement of Resilience Coefficient]

To the golf ball, was impacted a hollow cylinder made of aluminum of which weight being 200 g at a velocity of 40 m/s. Then, velocity of the hollow cylinder prior to and after the impact, and the velocity of the golf ball after the impact were measured. Thus, a resilience coefficient of the golf ball was determined by calculation. Mean values of data which resulted from 12 times measurement are shown in Table 5 below as indices on the basis of the resilience coefficient of the golf ball of Comparative Example 1 which was converted to be 1.00.

[Evaluation of Durability]

A driver with a metal head (Sumitomo Rubber Industries, Ltd., trade name "XXIO #1") was equipped with a swing machine (manufactured by Golf Laboratory Co.). Then the machine condition was set to give the head speed of 45 m/sec, and golf balls were hit therewith. A plate for collision made of steel was placed on the line of flight, and the golf ball immediately after the impact was rendered to collide onto the collision plate. This process was repeated until the golf ball cracked, and number of times of the collision until the onset of cracking was counted. Indices calculated on the basis of the number of times of the collision of the golf ball of Comparative Example 1, which was converted to be 100, are shown in Table 5 below.

[Travel Distance Test]

A driver with a metal head ("XXIO #1" described above) was equipped with the swing machine described above. Then the machine condition was set to give the head speed of 45 m/sec, and golf balls were hit therewith. Travel distance (i.e., the distance from the launching point to the point where the ball stopped) was thus measured. Mean values of 5 times measurement are shown in Table 5 below.

[Scuff resistance]

A pitching wedge (Sumitomo Rubber Industries, Ltd., "XXIO PW") was equipped with the swing machine described above. Then the machine condition was set to give the head speed of 36 m/sec, and golf balls were hit therewith. The surface condition of the golfball after hitting was visually observed, and was evaluated in accordance with the following criteria.

A: with small number of scratches although not remarkable

B: with scratches and fuzz

C: with parts scraped away and remarkable fuzz

[Evaluation of Control Performance]

Using a pitching wedge, golf balls were hit by 10 senior golfers. Thus, the control performance was evaluated. Those which were liable to be spun around and excellent in the control performance were assigned "A", those which were difficult to be spun around and inferior in the control performance were assigned "C", and those which were in an intermediate range between them were assigned "B". Results of evaluation which gave a maximum convergence are presented in Table 5 below.

TABLE 5

Results of Evaluation

| | Example 1 | Example 2 | Example 3 | Example 4 | Example 5 | Com. Example 1 | Com. Example 2 | Com. Example 3 | Com. Example 4 |
|---|---|---|---|---|---|---|---|---|---|
| Hardness Hm | 61 | 61 | 61 | 64 | 61 | 61 | 61 | 61 | 61 |
| Hardness Hc | 42 | 42 | 47 | 42 | 42 | 42 | 42 | 60 | 48 |
| Difference (Hm − Hc) | 19 | 19 | 14 | 22 | 19 | 19 | 19 | 1 | 13 |
| Proportion R1 (%) | 20.8 | 16.7 | 20.8 | 20.8 | 20.8 | 6.9 | 0 | 20.8 | 20.8 |
| Proportion R2 (%) | 0 | 0 | 0 | 0 | 0 | 0 | 0 | 0 | 0 |
| Mean value of (B/T) | 0.812 | 0.826 | 0.812 | 0.812 | 0.812 | 0.821 | 0.875 | 0.812 | 0.812 |

TABLE 5-continued

Results of Evaluation

|  | Example 1 | Example 2 | Example 3 | Example 4 | Example 5 | Com. Example 1 | Com. Example 2 | Com. Example 3 | Com. Example 4 |
|---|---|---|---|---|---|---|---|---|---|
| Principal component of cover *1 | U | U | U | U | U | U | U | I | I |
| Amount of compression deformation (mm) | 2.8 | 2.8 | 2.7 | 2.7 | 2.5 | 2.8 | 2.8 | 2.6 | 2.7 |
| Resilience coefficient (index) | 1.01 | 1.01 | 1.02 | 1.02 | 1.02 | 1.00 | 0.99 | 1.03 | 1.00 |
| Durability (index) | 100 | 100 | 100 | 101 | 103 | 100 | 102 | 91 | 98 |
| Travel distance (m) | 218.5 | 217.9 | 220.3 | 219.5 | 219.7 | 214.2 | 213.0 | 221.0 | 217.5 |
| Scuff resistance | A | A | A | A | A | A | A | B | C |
| Control performance | A | A | A | A | A | A | A | C | B |

*1 U: Thermoplastic polyurethane elastomer
I: Ionomer resin

As is clear from Table 5, the golf ball of each of Examples is excellent in all terms of a resilience performance, durability, a flight performance, a scuff resistance and a control performance. Accordingly, advantages of the present invention are clearly indicated by these results of evaluation.

The description herein above is merely for illustrative examples, therefore, various modifications can be made without departing from the principles of the present invention.

What is claimed is:

1. A golf ball which comprises a core, a cover and numerous dimples formed on the surface of said cover,
    wherein a base polymer of said cover includes a thermoplastic polyurethane elastomer as a principal component, and
    a proportion R1 of number of dimples having a ratio (B/T), which is a ratio of a height B of a bottom of the dimple to a nominal thickness T of the cover, of equal to or less than 0.70 occupied in total number of the dimples is equal to or greater than 10%, and
    wherein a proportion R2 of number of dimples having said ratio (BIT) of less than 0.30 occupied in total number of the dimples is equal to or less than 10%.

2. The golf ball according to claim 1 wherein a mean value of the ratio (B/T) for all the dimples is equal to or less than 0.86.

3. The golf ball according to claim 1, further comprising a mid layer having a Shore D hardness equal to or greater than 55.

4. A golf ball which comprises a core, a cover and numerous dimples formed on the surface of said cover,
    wherein a base polymer of said cover includes a thermoplastic polyurethane elastomer as a principal component, and
    a proportion R1 of number of dimples having a ratio (B/T), which is a ratio of a height B of a bottom of the dimple to a nominal thickness T of the cover, of equal to or less than 0.70 occupied in total number of the dimples is equal to or greater than 10%,
    wherein said core has a center and a mid layer, and wherein the Shore D hardness of the mid layer is greater than the Shore D hardness of the cover, and
    wherein a proportion R2 of number of dimples having said ratio (BIT) of less than 0.30 occupied in total number of the dimples is equal to or less than 10%.

5. The golf ball according to claim 4, wherein a mean value of the ratio (B/T) for all the dimples is equal to or less than 0.86.

6. The golf ball according to claim 4, further comprising a mid layer, wherein the difference in the Shore D hardness of the mid layer and the Shore D hardness of the cover is equal to or greater than 5.

7. The golf ball according to claim 6, wherein Shore D hardness of said mid layer is equal to or greater than 55.

* * * * *